US011518041B2

(12) United States Patent
Onishi et al.

(10) Patent No.: US 11,518,041 B2
(45) Date of Patent: Dec. 6, 2022

(54) EXPLOSION-PROOF ROBOT

(71) Applicant: MITSUBISHI HEAVY INDUSTRIES, LTD., Tokyo (JP)

(72) Inventors: Ken Onishi, Tokyo (JP); Koji Shukutani, Tokyo (JP); Hiroyoshi Okazaki, Tokyo (JP); Syuhei Kobori, Tokyo (JP); Atsushi Kamiyoshi, Tokyo (JP); Kyohei Hisakawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 923 days.

(21) Appl. No.: 16/337,576

(22) PCT Filed: Jun. 29, 2017

(86) PCT No.: PCT/JP2017/023941
§ 371 (c)(1),
(2) Date: Mar. 28, 2019

(87) PCT Pub. No.: WO2018/078951
PCT Pub. Date: May 3, 2018

(65) Prior Publication Data
US 2020/0030989 A1 Jan. 30, 2020

(30) Foreign Application Priority Data

Oct. 28, 2016 (JP) .............................. JP2016-211595

(51) Int. Cl.
*B25J 11/00* (2006.01)
*B25J 9/00* (2006.01)
(Continued)

(52) U.S. Cl.
CPC ......... *B25J 11/0025* (2013.01); *B25J 9/0009* (2013.01); *B25J 19/0075* (2013.01); *B25J 5/00* (2013.01)

(58) Field of Classification Search
CPC .. B25J 11/0025; B25J 9/0009; B25J 19/0075; B25J 5/00
See application file for complete search history.

(56) References Cited

U.S. PATENT DOCUMENTS

| 4,931,617 A | 6/1990 | Toyoda et al. |
| 5,440,916 A | 8/1995 | Stone et al. |
| (Continued) | | |

FOREIGN PATENT DOCUMENTS

| CN | 104828163 A | 8/2015 |
| CN | 207195536 U | 4/2018 |
| (Continued) | | |

OTHER PUBLICATIONS

"Design of Running System and Performance Evaluation for Rescue Robot UMRS2010" by Bordegnoni et al. Apr. 2012 (Year: 2012).*

(Continued)

*Primary Examiner* — Randell J Krug
(74) *Attorney, Agent, or Firm* — WHDA, LLP

(57) ABSTRACT

An explosion-proof robot is an explosion-proof robot which is capable of self-propulsion on a field and includes: an explosion-proof casing of a hollow shape inside of which at least one electric component is placed; and a cover including a nonmetal material and covering at least part of an outer surface of the explosion-proof casing.

6 Claims, 1 Drawing Sheet

(51) Int. Cl.
B25J 19/00 (2006.01)
B25J 5/00 (2006.01)

(56) References Cited

U.S. PATENT DOCUMENTS

| | | |
|---|---|---|
| 3,033,189 A1 | 10/2011 | Hayakawa et al. |
| 2011/0034220 A1 | 2/2011 | Lee |
| 2017/0334070 A1* | 11/2017 | Bordegnoni ........... B25J 19/028 |

FOREIGN PATENT DOCUMENTS

| | | |
|---|---|---|
| EP | 3 196 244 A1 | 7/2017 |
| GB | 2 196 494 A | 4/1988 |
| JP | S61-110678 A | 5/1986 |
| JP | S63-081511 A | 4/1988 |
| JP | H01-318104 A | 12/1989 |
| JP | H06-196240 A | 7/1994 |
| JP | 08185995 A * | 7/1996 |
| JP | H08-185995 A | 7/1996 |
| JP | 2796482 B2 | 9/1998 |
| JP | 2002-95515 A | 4/2002 |
| JP | 2006-234728 A | 9/2006 |
| JP | 2010-122930 A | 6/2010 |
| JP | 2013-125321 A | 6/2013 |
| JP | 2015-36172 A | 2/2015 |
| JP | 2016-74808 A | 5/2016 |
| WO | 2007/074891 A1 | 7/2007 |

OTHER PUBLICATIONS

Extended European Search Report dated Oct. 22, 2019, issued in counterpart EP Application No. 17865436.4. (10 pages).
International Search Report dated Oct. 3, 2017, issued in counterpart application No. PCT/JP2017/023941, with English translation. (14 pages).
Notification of Transmittal of Translation of the International Preliminary Report on Patentability (Form PCT/IB/338) issued in counterpart International Application No. PCT/JP2017/023941 dated May 9, 2019 with Forms PCT/IB/326, PCT/IB/373 and PCT/ISA/237, with English translation. (19 pages).
Ken Onishi et al., "Development of flammable gas atmosphere probe robots: Report on remote-controlled mobile robot that was first to acquire explosion-proof type examination certification in Japan from NEDO 'Project for development of system responsive to social issues such as infrastructure maintenance and renewal'", DVD-ROM of the Proceedings of the 34th annual conference of the Robotics Society of Japan, The Robotics Society of Japan, Sep. 7, 2016, RSJ2016AC1Y3-03, particularly p. 3, right column, line 10 to p. 4, left column, line 9, fig. 5 to 6, cited in ISR dated Oct. 3, 2017, in the JP Office Action dated Sep. 21, 2018, and in the IPRP dated May 9, 2019. (4 pages).
Kyohei Gokurakuji et al., "Design of Running System and Performance Evaluation for Rescue Robot UMRS2010", Research Reports of Kobe City College of Technology [online], Kobe Kosen Joho Iinkai, Apr. 14, 2012, Internet; <URL: http://www.kobe-kosen.ac.jp/activity/publication/kiyou/Kiyou11/>, No. 50, pp. 77-22, particularly p. 17, left column, line 1 to p. 18, right column, line 2, cited in ISR dated Oct. 3, 2017, in the JP Office Action dated Sep. 21, 2018, and in the IPRP dated May 9, 2019. (6 pages).
Office Action dated Sep. 21, 2018, issued in counterpart JP application No. 2016-211595, with English translation. (9 pages).
"Explosion-Proof Safety Guidebook (Explosion-Proof Electrical Machinery Inspection Guidebook for Equipment Safety)" by the Explosion-Proof Committee of Nippon Elecric Control Equipment Industries Association, cited in the specification. (3 pages).
Office Action dated Jul. 22, 2020, issued in counterpart EP Application No. 17865436.4. (6 pages).

* cited by examiner

EXPLOSION-PROOF ROBOT

TECHNICAL FIELD

The present disclosure relates to an explosion-proof robot that can be used in an explosive atmosphere.

BACKGROUND

Explosion-proof equipment to which explosion-proof measures are applied from the viewpoint of industrial safety is used for disaster prevention work and building maintenance work in the explosive atmosphere. The explosion-proof measures are applied to the explosion-proof equipment so that electric sparks at electric components to be used and high-temperature parts will not become ignition sources in the explosive atmosphere.

Testing by the relevant type examination agency is practically required in order to use the explosion-proof equipment in actual work. Such testing is conducted in accordance with, for example, the Internationally Consistent Explosion-Proof Guidelines 2008 Ex which are international standards (regarding specific operation of the standards, please refer to, for example, Non-patent Document 1).

As some examples of this type of explosion-proof equipment, Patent Documents 1 and 2 disclose explosion-proof structures used for explosion-proof robots which enter the explosive atmosphere and perform work. Patent Document 1 discloses an explosion-proof structure that prevents an explosive gas from flowing into a casing, in which an electric component exists, by supplying air from an air supply source provided outside via an air pipe into the casing for a robot and thereby keeping the pressure inside the casing to be higher than the pressure of the surrounding explosive atmosphere. This document particularly describes that when there is fear that the explosive gas might flow into the casing as a result of reduction in the pressure within the casing, a protective monitoring device which blocks electric conduction to the electric component in the casing is included.

Furthermore, Patent Document 2 discloses an explosion-proof structure equipped with an air tank, which supplies air into a casing, outside of the casing, Patent Document 2 describes, like Patent Document 1, that when the pressure within the casing decreases, the electric conduction to an electric component in the casing is blocked.

Patent Document 3 discloses a power supply system for supplying electric power to a mobile robot from a power supply duct having an explosion-proof structure of an internal pressure application system as a power supply system to the mobile robot in an explosion-proof area.

Patent Document 4 discloses that an actuator having an electric element which may possibly spark is covered with a protective cover and is remotely operated from outside the cover in the explosive atmosphere.

Incidentally, since a nickel-aluminum-copper alloy or a beryllium copper does not spark, they are used as materials for an explosion-proof tool which can be used even in the explosive atmosphere.

CITATION LIST

Patent Literature

Patent Document 1: Japanese Patent No. 2796482
Patent Document 2: Japanese Patent Application Laid-Open (Kokai) Publication No. 2015-36172
Patent Document 3: Japanese Patent Application Laid-Open (Kokai) Publication No. H06-196240
Patent Document 4: Japanese Patent Application Laid-Open (Kokai) Publication No. S63-081511

Non-Patent Document

Non-patent Document 1: "Explosion-Proof Safety Guidebook (Explosion-Proof Electrical Machinery Inspection Guidebook for Equipment Safety)" by the Explosion-Proof Committee of NIPPON ELECTRIC CONTROL EQUIPMENT INDUSTRIES ASSOCIATION

SUMMARY

Technical Problem

Regarding the explosion-proof robot which moves in the explosive atmosphere, even if the robot itself has the explosion-proof structure, there is a possibility that a flammable gas explosion may occur as caused by mechanical sparks generated in case the robot should fall down the stairs and hit an obstacle.

Moreover, when part of a robot body is made of plastics for the purpose of weight reduction or, for example, wireless communication, non-contact power supply, and so on so as to allow permeation of electromagnetic waves, static electricity may sometimes be accumulated in the robot body. If the static electricity is accumulated and the robot hits a conductive metal object, electrostatic sparks may sometimes occur and there is a possibility that the electrostatic sparks may cause a flammable gas explosion.

At least one embodiment of the present invention was devised in light of the above-described circumstances and it is an object of the present invention to suppress the occurrence of the mechanical sparks and the electrostatic sparks while the explosion-proof robot is traveling or performing work and thereby prevent the occurrence of any flammable gas explosion.

Solution to Problem (1) An explosion-proof robot according to at least one embodiment of the present invention is an explosion-proof robot capable of self-propulsion on a field in order to solve the above-described problems and includes:

an explosion-proof casing of a hollow shape inside of which at least one electric component is placed; and a cover including a nonmetal material and covering at least part of an outer surface of the explosion-proof casing.

The "explosion-proof robot" herein used is a robot with an explosion-proof structure and the "explosion-proof structure" is a structured defined by the aforementioned Internationally Consistent Explosion-Proof Guidelines 2008 Ex. For example, it is an explosion-proof structure that prevents an explosive gas from flowing into the casing in which the electric component exists by keeping the pressure within the casing higher than the surrounding explosive atmosphere as disclosed in Patent Document 1, or it is an explosion-proof structure which contains an electric element in a pressure resistant container and will not exert any influence on a surrounding area around the pressure resistant container even if a flammable gas explosion occurs inside the pressure resistant container. Furthermore, the "explosion-proof casing" means a casing with the explosion-proof structure.

Since the explosion-proof robot has the explosion-proof structure, it can freely travel and perform work even in the explosive atmosphere.

According to the above-described configuration (1), at least part of the casing in which the electric component is placed is covered with the cover including a nonmetal material which has shock absorbability, so that even if the explosion-proof robot enters into contact with, or hits, any falling object or obstacle, the above-described cover absorbs shocks and, therefore, the occurrence of the mechanical sparks can be suppressed.

If the above-described nonmetal material is a nonmetal material which is flexible or elastic, the shock absorbability can be further enhanced and the mechanical sparks can be suppressed effectively.

As the nonmental material which can be applied to the cover, it is possible to apply, for example, woods, synthetic resins, a thermosetting elastomer which is commonly called as synthetic rubber (hereinafter sometimes referred to as the "synthetic rubber"), paper, leather (such as animal skin of cows, sheep, etc.), and so on.

When the volume of the cover is so small that electrification is not substantially caused by the static electricity, it is only necessary to consider suppressing the occurrence of the mechanical sparks and there is no need to consider the occurrence of the electrostatic sparks.

(2) According to one embodiment in the above-described configuration (1), the above-described cover is to cover at least a side face of the explosion-proof casing.

According to the above-described configuration (2), when the explosion-proof robot travels and performs some work, the occurrence of most of the mechanical sparks can be suppressed by covering the side face(s) of the casing, where the explosion-proof robot tends to easily enter into contact with, or hit, an obstacle(s), with the above-described cover.

(3) According to one embodiment in the above-described configuration (1) or (2), the above-described cover includes a nonmetal material which is electrically conductive.

When the volume of the above-described cover is small and an electric charge amount of the static electricity does not become large enough to generate the electrostatic sparks, it is unnecessary to consider the occurrence of the electrostatic sparks. However, if the volume of the above-described cover is large enough to enable electrification, it is necessary to take some measure to suppress the occurrence of the electrostatic sparks.

Accordingly, as the cover includes the nonmetal material which is electrically conductive, the static electricity which has been generated within the cover can be allowed to escape outside and the electric charge amount can be reduced. As a result, the occurrence of the electrostatic sparks can be suppressed.

As materials for the cover capable of suppressing the mechanical sparks and the electrostatic sparks, it is possible to apply, for example, woods, conductive resins, conductive synthetic rubber, paper, leather, and so on.

(4) According to one embodiment in the above-described configuration (3), an inner surface resistance value and an outer surface resistance value of the above-described cover are $1.0 \times 10^8 \Omega$ or less.

According to the above-described configuration (4), the inner surface resistance value and the outer surface resistance value (hereinafter sometimes referred to as the "surface resistance value") is $1.0 \times 10^8 \Omega$ or less, so that the static electricity which has been generated at the cover can be allowed to escape outside and the electric charge amount caused by the static electricity can be reduced. As a result, the occurrence of the electrostatic sparks can be suppressed.

If the surface resistance value of the cover exceeds $1.0 \times 10^8 \Omega$, the electric conductivity reduces; and, therefore, the electric charge amount of the cover increases and there is fear that the electrostatic sparks may occur as a result of entering contact with, or hitting, any falling object or obstacle.

(5) According to one embodiment in any one of the above-described configurations (1) to (4), the above-described cover is formed to be softer than the explosion-proof casing.

According to the above-described configuration (5), the shock absorbability of the above-described cover increases more than that of the explosion-proof casing. So, even if the explosion-proof robot enters into contact with, or hits, any falling object or obstacle, the above-described cover absorbs shocks, so that the occurrence of the mechanical sparks can be suppressed more as compared to when the explosion-proof casing enters into contact with, or hits, the falling object or the obstacle.

(6) According to one embodiment in any one of the above-described configurations (1) to (5), the above-described nonmetal material includes leather.

Since the leather such as animal skin of cows, sheep, etc. has the surface resistance value of approximately $1.0 \times 10^8 \Omega$, the static electricity which has been generated at the cover can be allowed to escape outside and the electric charge amount caused by, for example, the static electricity can be reduced. As a result, the occurrence of the electrostatic sparks can be suppressed.

Therefore, when the explosion-proof robot enters into contact with, or hits, any falling object or obstacle, the occurrence of the electrostatic sparks can be suppressed by covering the explosion-proof casing with the leather. Moreover, the leather has good shock absorbability and can suppress the mechanical sparks even if the explosion-proof robot enters into contact with, or hits, any obstacle.

Incidentally, moisture and humidity have electrically conductive property. Since the animal skin has hygroscopic property, the electric conductivity can be enhanced by absorbing the humidity; and as a result, the effect of suppressing the electrostatic sparks can be enhanced.

(7) According to one embodiment in any one of the above-described configurations (1) to (5), the above-described nonmetal material includes conductive synthetic rubber (for example, rubber tires of vehicles).

Since the conductive synthetic rubber generally has the surface resistance value of $1.0 \times 10^6$ to $1.0 \times 10^8 \Omega$, the electrification caused by the static electricity can be allowed to escape outside and the electric charge amount can be reduced. As a result, the occurrence of the electrostatic sparks can be suppressed. Furthermore, the conductive synthetic rubber is very elastic and has good shock absorbability, the occurrence of the mechanical sparks can be suppressed.

(8) One embodiment in any one of the above-described configurations (1) to (7) further includes a self-propelled unit provided on at least one surface of the explosion-proof casing and the above-described nonmetal material is provided to cover at least around the self-propelled unit of the explosion-proof casing.

According to the above-described configuration (8), at least the periphery of the self-propelled unit includes the nonmetal material. So, even if the self-propelled unit enters into contact with, or hits, any obstacle, the occurrence of the mechanical sparks and the electrostatic sparks can be suppressed.

Advantageous Effects

According to at least one embodiment of the present invention, even when the explosion-proof robot freely travels and performs work in the explosive atmosphere, the occurrence of at least the mechanical sparks can be suppressed and, therefore, the occurrence of a flammable gas explosion caused by the mechanical sparks can be prevented.

Accordingly, it becomes possible for various types of explosion-proof robots to operate in the explosive atmosphere, so that the situation such as disasters can be checked promptly and securely and the level of life saving and facility maintenance can be upgraded. Furthermore, labor cost can be reduced and inspection frequency can be enhanced by using the explosion-proof robot(s) to, for example, patrol a petrochemical plant.

DETAILED DESCRIPTION

Figure 1:
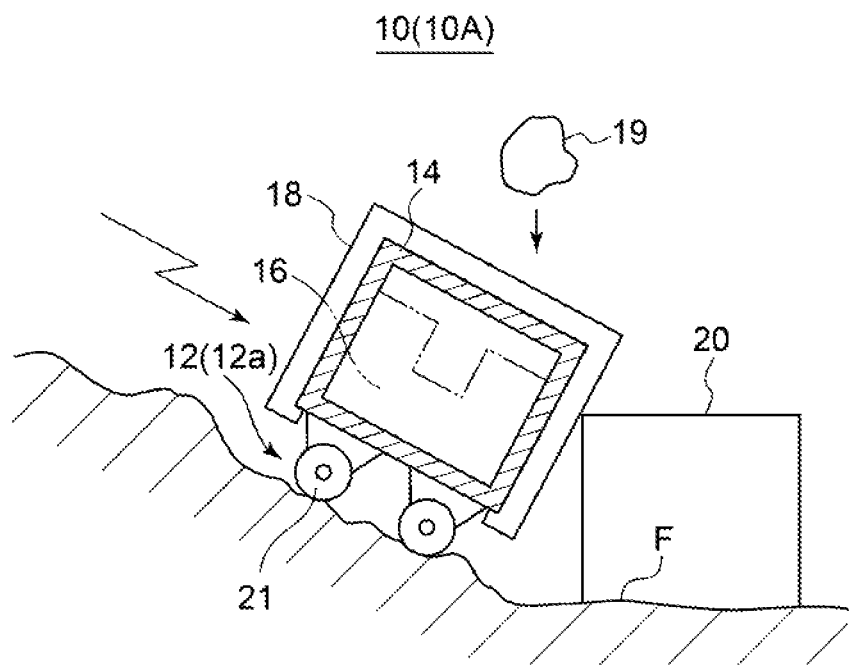
FIG. 1 is a sectional view of an explosion-proof robot according to one embodiment.

Some embodiments of the present invention will now be described in detail with reference to the accompanying drawings. It is intended, however, that dimensions, materials, shapes, relative positions and the like of components described in the embodiments or illustrated in the drawings shall be interpreted as illustrative only and not limitative of the scope of the present invention.

For example, expressions representing relative or absolute positioning such as "in a certain direction," "along a certain direction," "parallel," "perpendicular to," "center," "concentric," or "coaxial" not only strictly represent such arrangement, but also represent a state where its position is relatively changed within tolerance or by an angle or distance of some degree that allows to obtain the same function.

For example, expressions representing shapes such as a quadrangular shape and a cylindrical shape not only represent the shapes of, for example, the quadrangular shape and the cylindrical shape in a geometrically strict sense, but also represent shapes including protrusions, recesses, chamfered parts, etc. within a range capable of obtaining the same effects.

Meanwhile, expressions such as "comprise/comprising," "contain/containing," "be equipped with," "include/including," or "have/having" one constituent element are not exclusive expressions that exclude the existence of other constituent elements.

Figure 2:
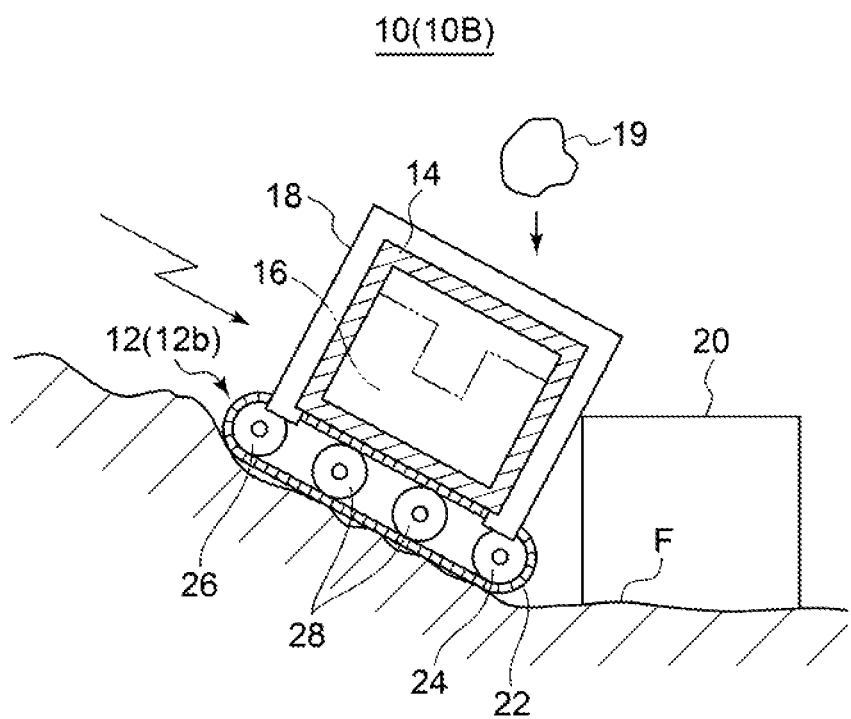
FIG. 2 is a sectional view of an explosion-proof robot according to one embodiment.

An explosion-proof robot 10 (10A, 10B) according to some embodiments is illustrated in FIG. 1 and FIG. 2.

Referring to FIG. 1 and FIG. 2, the explosion-proof robot 10 (10A, 10B) has a traveling unit 12 (12a, 12b) and is capable of self-propulsion on field F in an inflammable gas atmosphere. Furthermore, the explosion-proof robot 10 (10A, 10B) includes an explosion-proof casing 14 of a hollow shape and an electric component 16 for the explosion-proof robot 10 to perform the intended work is placed inside the explosion-proof casing 14. The explosion-proof robot 10 (10A, 10B) includes a cover 18 which covers at least part of an outer surface of the explosion-proof casing 14 on the outside of the explosion-proof casing 14. The cover 18 includes a nonmetal material and, for example, is composed of the nonmetal material.

When the explosion-proof robot 10 with the above-described configuration travels and performs work, the cover 18 which covers at least part of the explosion-proof casing 14 is made of the nonmetal material which has shock absorbability, so that even if the explosion-proof robot 10 enters into contact with, or hits, any falling object 19 or obstacle 20, the cover 18 exhibits the shock absorbability and the occurrence of the mechanical sparks can be suppressed. Therefore, the occurrence of a flammable gas explosion caused by the mechanical sparks can be prevented.

In one embodiment as illustrated in FIG. 1, the explosion-proof robot 10 (10A) is provided with the traveling unit 12 (12a) on at least one surface of the explosion-proof casing 14 and includes wheels 21 as the traveling unit 12 (12a).

In one embodiment as illustrated in FIG. 2, the explosion-proof robot 10 (10B) is provided with the traveling unit 12 (12b) on at least one surface of the explosion-proof casing 14 and includes an endless track as the traveling unit 12 (12b).

The explosion-proof robot 10 (10A, 10B) has the cover 18, which includes the nonmetal material having the shock absorbability, to cover the explosion-proof casing 14 in which the electric component 16 is placed, so that even if the explosion-proof robot 10 enters into contact with, or hits, any falling object 19 or obstacle 20, the cover 18 absorbs shocks and, therefore, the occurrence of the mechanical sparks can be suppressed.

As the nonmetal material to configure the cover 18, it is possible to apply, for example, woods, synthetic resins, synthetic rubber, paper, leather (such as animal skin of cows, sheep, etc.). Particularly, if the nonmetal material is flexible or elastic, the shock absorbability can be enhanced.

In one embodiment, the cover 18 can be of a jacket structure which has a space inside. By having the space inside, a dent(s) can be easily formed in the cover 18 when the explosion-proof robot 10 enters into contact with, or hits, any falling object 19 or obstacle 20. As a result, the shock absorbability can be enhanced.

In one embodiment, the cover 18 is located at a position to cover at least a side face of the explosion-proof casing 14.

The occurrence of substantially most of the mechanical sparks can be suppressed by covering the side face of the explosion-proof casing 14, which can easily enter into contact with, or hit, any obstacle 20, with the cover 18.

In one embodiment, when the volume of the cover 18 is so large to cause electrification by, for example, static electricity, the cover 18 is to be manufactured with the nonmetal material which is electrically conductive.

When the volume of the cover 18 is small and an electric charge amount of the static electricity does not become large enough to generate the electrostatic sparks, there is no need to consider the occurrence of the electrostatic sparks. However, if the volume of the cover 18 is so large to cause the electrification, the cover 18 is to be manufactured with the nonmetal material which is electrically conductive in order to suppress the occurrence of the electrostatic sparks.

By manufacturing the cover 18 with the nonmetal material which is electrically conductive, the static electricity generated at the cover 18 can be allowed to escape outside and, as a result, the occurrence of the electrostatic sparks can be suppressed.

As the conductive nonmental material capable of suppressing not only the mechanical sparks, but also the electrostatic sparks, it is possible to apply, for example, woods, conductive resins, conductive synthetic rubber, paper, leather, and so on.

In one embodiment, the cover 18 which has the surface resistance value of $1.0 \times 10^8 \Omega$ or less is used. By using the cover with the surface resistance value within the above-described range, the cover 18 can be made electrically conductive and, therefore, the static electricity can be allowed to escape outside and the electric charge amount can be reduced. As a result, the occurrence of the electrostatic sparks can be suppressed.

When the surface resistance value of the cover 18 exceeds $1.0 \times 10^8 \Omega$, the electric conductivity reduces and the electric charge amount of the cover 18 thereby increases. So, when the cover 18 enters into contact with, or hits, any falling object 19 or obstacle 20, there is fear that the electrostatic sparks may occur.

In one embodiment, the cover 18 is formed to be softer than the explosion-proof casing 14.

Accordingly, the shock absorbability of the cover 18 increases more than that of the explosion-proof casing 14. So, even if the explosion-proof robot 10 enters into contact with, or hits, any falling object 19 or obstacle 20, the cover 18 absorbs shocks. Therefore, the occurrence of the mechanical sparks can be suppressed more as compared to when the explosion-proof casing 14 enters into contact with, or hits, the falling object 19 or the obstacle 20.

In one embodiment, the cover 18 is manufactured with leather (such as animal skin of cows, sheep, etc.). Since the animal skin generally has the surface resistance value of approximately $10^8 \Omega$, no electrostatic sparks will be generated even if the animal skin enters into contact with, or hits, any falling object 19 or obstacle 20. Furthermore, the leather has good shock absorbability and the occurrence of the mechanical sparks can be suppressed even if the leather enters into contact with, or hits, any falling object 19 or obstacle 20.

Incidentally, moisture and humidity have electrically conductive property. Since the leather has hygroscopic property, the electric conductivity can be enhanced by absorbing the humidity; and as a result, the effect of suppressing the electrostatic sparks can be enhanced by manufacturing the cover 18 with the leather.

In one embodiment, the cover 18 is manufactured with conductive synthetic rubber (for example, the same materials as those for rubber tires of vehicles).

The conductive synthetic rubber generally has the surface resistance value of $1.0 \times 10^6$ to $1.0 \times 10^8 \Omega$ and is electrically conductive. Furthermore, since the conductive synthetic rubber is very elastic and has good shock absorbability, the occurrence of the mechanical sparks and the electrostatic sparks can be suppressed.

In one embodiment, the traveling unit 12 (12a) illustrated in FIG. 1 is a plurality of wheels 21 and at least the periphery of the wheels 21 is manufactured with the nonmetal material (for example, the conductive synthetic rubber). As a result, even if the wheels 21 enter into contact with, or hit, any obstacle 20, the occurrence of the mechanical sparks and the electrostatic sparks can be suppressed.

In one embodiment, the traveling unit 12 (12b) illustrated in FIG. 2 is an endless track and at least the periphery of this endless track is manufactured with the conductive synthetic rubber.

At least the periphery of the endless track is made of the nonmetal material (for example, the conductive synthetic rubber), so that even if the endless track enters into contact with, or hits, any obstacle 20, the occurrence of the mechanical sparks and the electrostatic sparks can be suppressed.

In one embodiment, the above-described endless track includes, as illustrated in FIG. 2, a crawler 22, a drive wheel 24 which drives the crawler 22, an idler wheel 26 which guides the crawler 22, and trank rollers 28 which guide the crawler 22. For example, conductive nitrile rubber NBR which has excellent tensile strength and wear resistance is used as the conductive synthetic rubber which constitutes at least the periphery of the crawler 22.

As a result, the occurrence of the mechanical sparks and the electrostatic sparks can be suppressed effectively and this can be durable in the inflammable gas atmosphere for a long period of time.

By using the explosion-proof robot 10 according to the above-described embodiment, it becomes possible for various types of explosion-proof robots to operate in the explosive atmosphere, so that the situation such as disasters can be checked promptly and securely and the level of life saving and facility maintenance can be upgraded. Furthermore, labor cost can be reduced and inspection frequency can be enhanced by using the explosion-proof robot(s) to, for example, patrol a petrochemical plant.

INDUSTRIAL APPLICABILITY

The explosion-proof robot according to some embodiments of the present invention can be used as an explosion-proof robot which can be used in the explosive atmosphere.

REFERENCE SIGNS LIST 10 (10A, 10B) Explosion-Proof Robot
12 (12a, 12b) Traveling Unit
14 Explosion-Proof Casing
16 Electric Component
18 Cover
19 Falling Object
20 Obstacle
21 Wheels
22 Crawler
24 Drive Wheel
26 Idler Wheel
28 Trank Roller
F Field

The invention claimed is:

1. An explosion-proof robot capable of self-propulsion on a field, comprising:
   an explosion-proof casing of a hollow shape inside of which at least one electric component is placed; and
   a cover including a nonmetal material and covering at least part of an outer surface of the explosion-proof casing,
   wherein the cover includes a nonmetal material which is electrically conductive, and
   wherein an inner surface resistance value and an outer surface resistance value of the cover are $1.0 \times 10^8 \Omega$ or less.

2. The explosion-proof robot according to claim 1, wherein the cover covers at least a side face of the explosion-proof casing.

3. The explosion-proof robot according to claim 1, wherein the cover is formed to be softer than the explosion-proof casing.

4. The explosion-proof robot according to claim 1, wherein the nonmetal material includes leather.

5. The explosion-proof robot according to claim 1, wherein the nonmetal material includes conductive synthetic rubber.

6. The explosion-proof robot according to claim 1, further comprising a self-propelled unit provided on at least one surface of the explosion-proof casing,
   wherein the nonmetal material is provided to cover at least around the self-propelled unit of the explosion-proof casing.

* * * * *